United States Patent
Raghavan

(10) Patent No.: US 7,429,229 B2
(45) Date of Patent: Sep. 30, 2008

(54) MULTI-SPEED TRANSMISSIONS WITH A LONG PINION AND FOUR FIXED INTERCONNECTIONS

(75) Inventor: Madhusudan Raghavan, West Bloomfield, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 168 days.

(21) Appl. No.: 11/440,512

(22) Filed: May 25, 2006

(65) Prior Publication Data

US 2007/0275813 A1    Nov. 29, 2007

(51) Int. Cl.
F16H 3/62 (2006.01)
(52) U.S. Cl. ...................................................... 475/275
(58) Field of Classification Search .................. 475/275
See application file for complete search history.

(56) References Cited

U.S. PATENT DOCUMENTS

| | | | | |
|---|---|---|---|---|
| 4,070,927 A | | 1/1978 | Polak | 475/286 |
| 4,658,672 A | * | 4/1987 | Michael | 475/280 |
| 4,709,594 A | | 12/1987 | Maeda | 475/280 |
| 5,106,352 A | * | 4/1992 | Lepelletier | 475/280 |
| 5,133,697 A | * | 7/1992 | Hattori | 475/276 |
| 5,385,064 A | | 1/1995 | Reece | 74/331 |
| 5,497,867 A | | 3/1996 | Hirsch et al. | 192/48.91 |
| 5,518,465 A | * | 5/1996 | Hiraiwa | 475/275 |
| 5,560,461 A | | 10/1996 | Loeffler | 192/53.32 |
| 5,599,251 A | | 2/1997 | Beim et al. | 475/275 |
| 5,641,045 A | | 6/1997 | Ogawa et al. | 192/53.341 |
| 5,651,435 A | | 7/1997 | Perosky et al. | 192/219 |
| 5,975,263 A | | 11/1999 | Forsyth | 192/53.32 |
| 6,053,839 A | | 4/2000 | Baldwin et al. | 475/281 |
| 6,071,208 A | | 6/2000 | Koivunen | 475/275 |
| 6,083,135 A | | 7/2000 | Baldwin et al. | 475/276 |
| 6,217,474 B1 | | 4/2001 | Ross et al. | 475/269 |
| 6,354,416 B1 | | 3/2002 | Eo | 192/53.341 |
| 6,375,592 B1 | | 4/2002 | Takahashi et al. | 475/262 |
| 6,422,969 B1 | | 7/2002 | Raghavan et al. | 475/276 |
| 6,425,841 B1 | | 7/2002 | Haka | 475/275 |
| 6,471,615 B1 | | 10/2002 | Naraki et al. | 475/262 |
| 6,558,287 B2 | | 5/2003 | Hayabuchi et al. | 475/271 |
| 6,623,397 B1 | | 9/2003 | Raghavan et al. | 360/96.5 |
| 6,840,885 B2 | | 1/2005 | Yi et al. | 475/276 |

FOREIGN PATENT DOCUMENTS

JP          09-126283          5/1997

* cited by examiner

Primary Examiner—Ha D. Ho

(57) ABSTRACT

The family of transmissions has a plurality of members that can be utilized in powertrains to provide at least six forward speed ratios and one reverse speed ratio. The transmission family members include three planetary gear sets having up to seven torque-transmitting mechanisms and four interconnecting members. The powertrain includes an engine that is selectively or continuously connectable to at least one of the planetary gear members and an output shaft that is continuously connected with another one of the planetary gear members. The torque-transmitting mechanisms provide interconnections between various gear members, the input shaft and the transmission housing, and are operated in combinations of two to establish at least six forward speed ratios and at least one reverse speed ratio.

17 Claims, 6 Drawing Sheets

| | RATIOS | 55 | 57 | 50 | 52 | 54 |
|---|---|---|---|---|---|---|
| Reverse | -3.81 | X | | | | X |
| Neutral | 0 | X | | | | |
| 1 | 3.9 | X | | X | | |
| 2 | 2.2 | | X | X | | |
| 3 | 1.52 | | | X | | X |
| 4 | 1 | | | X | X | |
| 5 | 0.7 | | | | X | X |
| 6 | 0.59 | | X | | X | |

(X = ENGAGED CLUTCH)

| FIXED-RATIO MODE | |
|---|---|
| RATIO SPREAD | 6.64 |
| RATIO STEPS | |
| Rev/1 | -0.98 |
| 1/2 | 1.78 |
| 2/3 | 1.45 |
| 3/4 | 1.52 |
| 4/5 | 1.44 |
| 5/6 | 1.18 |

SAMPLE DESIGN:

$\frac{\text{RING GEAR}}{\text{SUN GEAR}}$ TOOTH RATIO: $\frac{N_{R1}}{N_{S1}} = 2.90$, $\frac{N_{R2}}{N_{S2}} = 2.76$, $\frac{N_{R3}}{N_{S3}} = 1.67$

| | RATIOS | 155 | 157 | 150 | 152 | 154 |
|---|---|---|---|---|---|---|
| Reverse | -4.37 | | X | | | X |
| Neutral | 0 | | X | | | |
| 1 | 4.58 | | X | | X | |
| 2 | 2.41 | X | | | X | |
| 3 | 1.61 | | | | X | X |
| 4 | 1 | | | X | X | |
| 5 | 0.7 | | | X | | X |
| 6 | 0.6 | X | | X | | |

(X = ENGAGED CLUTCH)

| FIXED-RATIO MODE | |
|---|---|
| RATIO SPREAD | 7.56 |
| RATIO STEPS | |
| Rev/1 | -0.95 |
| 1/2 | 1.9 |
| 2/3 | 1.5 |
| 3/4 | 1.61 |
| 4/5 | 1.42 |
| 5/6 | 1.16 |

SAMPLE DESIGN:

$\frac{\text{RING GEAR}}{\text{SUN GEAR}}$ TOOTH RATIO: $\frac{N_{R1}}{N_{S1}} = 2.75,\ \frac{N_{R2}}{N_{S2}} = 1.53,\ \frac{N_{R3}}{N_{S3}} = 1.85$

| | RATIOS | 250 | 252 | 254 | 255 | 256 | 257 | 258 |
|---|---|---|---|---|---|---|---|---|
| Reverse | -13.89 | | | | X | | X | |
| Reverse' | -1.51 | | | X | | X | | |
| Neutral | 0.00 | | | | X | | | |
| 1 | 10.92 | | | | X | X | | |
| 2 | 4.76 | | | X | | | X | |
| 3 | 2.50 | X | | | | | X | |
| 4 | 1.67 | | X | | | X | | |
| 5 | 1.25 | | | X | | | | X |
| 6 | 1.10 | X | | | | | | X |
| 7 | 1.00 | X | X | | | | | |
| 8 | 0.93 | | X | | | | | X |

(X = ENGAGED CLUTCH)

| FIXED-RATIO MODE | |
|---|---|
| RATIO SPREAD | 11.74 |
| RATIO STEPS | |
| Rev/1 | -1.27 |
| 1/2 | 2.29 |
| 2/3 | 1.90 |
| 3/4 | 1.50 |
| 4/5 | 1.34 |
| 5/6 | 1.14 |
| 6/7 | 1.10 |
| 7/8 | 1.08 |

SAMPLE DESIGN:

$\frac{\text{RING GEAR}}{\text{SUN GEAR}}$ TOOTH RATIO: $\frac{N_{R1}}{N_{S1}} = 1.50$, $\frac{N_{R2}}{N_{S2}} = 2.26$, $\frac{N_{R3}}{N_{S3}} = 2.92$,

| | RATIOS | 350 | 352 | 354 | 355 | 356 | 357 | 358 |
|---|---|---|---|---|---|---|---|---|
| Reverse | -5.22 | | X | | | | | X |
| Reverse' | -1.50 | X | | | | | | X |
| Neutral | 0.00 | | X | | | | | |
| 1 | 3.49 | | X | | | X | | |
| 2 | 2.00 | X | | | | X | | |
| 3 | 1.40 | | | X | | X | | |
| 4 | 1.00 | | X | X | | | | |
| 5 | 0.84 | | | X | | | X | |
| 6 | 0.68 | | X | | X | | | |
| 7 | 0.60 | X | | | X | | | |
| 8 | 0.59 | X | | | | | | X |

(X = ENGAGED CLUTCH)

| FIXED-RATIO MODE | |
|---|---|
| RATIO SPREAD | 5.92 |
| RATIO STEPS | |
| Rev/1 | -1.50 |
| 1/2 | 1.75 |
| 2/3 | 1.43 |
| 3/4 | 1.40 |
| 4/5 | 1.19 |
| 5/6 | 1.24 |
| 6/7 | 1.13 |
| 7/8 | 1.02 |

SAMPLE DESIGN:

$\frac{\text{RING GEAR}}{\text{SUN GEAR}}$ TOOTH RATIO: $\frac{N_{R1}}{N_{S1}} = 2.75$, $\frac{N_{R2}}{N_{S2}} = 1.50$, $\frac{N_{R3}}{N_{S3}} = 2.50$

| | RATIOS | 450 | 452 | 454 | 455 | 456 | 457 |
|---|---|---|---|---|---|---|---|
| Reverse | -2.96 | | | X | | | X |
| Neutral | 0.00 | | | X | | | |
| 1 | 3.57 | | | X | X | | |
| 2 | 2.52 | | X | | X | | |
| 3 | 1.85 | | X | X | | | |
| 4 | 1.52 | | X | | | X | |
| 5 | 1.00 | | | X | | X | |
| 6 | 0.61 | X | | | | X | |
| 7 | 0.54 | X | | X | | | |

| FIXED-RATIO MODE | |
|---|---|
| RATIO SPREAD | 6.67 |
| RATIO STEPS | |
| Rev/1 | -0.83 |
| 1/2 | 1.42 |
| 2/3 | 1.36 |
| 3/4 | 1.22 |
| 4/5 | 1.52 |
| 5/6 | 1.65 |
| 6/7 | 1.13 |

(X = ENGAGED CLUTCH)

SAMPLE DESIGN:

$\frac{\text{RING GEAR}}{\text{SUN GEAR}}$ TOOTH RATIO: $\frac{N_{R1}}{N_{S1}} = 1.52$, $\frac{N_{R2}}{N_{S2}} = 1.54$, $\frac{N_{R3}}{N_{S3}} = 2.96$

| | RATIOS | 550 | 552 | 554 | 555 | 556 | 557 |
|---|---|---|---|---|---|---|---|
| Reverse | -2.92 | | | X | | X | |
| Neutral | 0.00 | | | | | X | |
| 1 | 4.51 | | | | X | X | |
| 2 | 2.52 | | X | | | X | |
| 3 | 1.85 | | X | X | | | |
| 4 | 1.39 | | X | | | | X |
| 5 | 1.00 | X | X | | | | |
| 6 | 0.75 | X | | | | | X |
| 7 | 0.64 | X | | | X | | |

(X = ENGAGED CLUTCH)

| FIXED-RATIO MODE | |
|---|---|
| RATIO SPREAD | 7.06 |
| RATIO STEPS | |
| Rev/1 | -0.65 |
| 1/2 | 1.79 |
| 2/3 | 1.36 |
| 3/4 | 1.33 |
| 4/5 | 1.39 |
| 5/6 | 1.34 |
| 6/7 | 1.17 |

SAMPLE DESIGN:

$\frac{\text{RING GEAR}}{\text{SUN GEAR}}$ TOOTH RATIO: $\frac{N_{R1}}{N_{S1}} = 1.52$, $\frac{N_{R2}}{N_{S2}} = 2.49$, $\frac{N_{R3}}{N_{S3}} = 1.54$

MULTI-SPEED TRANSMISSIONS WITH A LONG PINION AND FOUR FIXED INTERCONNECTIONS

TECHNICAL FIELD

The present invention relates to a family of power transmissions having three planetary gear sets that are controlled by up to seven torque-transmitting devices to provide at least six forward speed ratios and at least one reverse speed ratio.

BACKGROUND OF THE INVENTION

Passenger vehicles include a powertrain that is comprised of an engine, multi-speed transmission, and a differential or final drive. The multi-speed transmission increases the overall operating range of the vehicle by permitting the engine to operate through its torque range a number of times. The number of forward speed ratios that are available in the transmission determines the number of times the engine torque range is repeated. Early automatic transmissions had two speed ranges. This severely limited the overall speed range of the vehicle and therefore required a relatively large engine that could produce a wide speed and torque range. This resulted in the engine operating at a specific fuel consumption point during cruising, other than the most efficient point. Therefore, manually-shifted (countershaft transmissions) were the most popular.

With the advent of three- and four-speed automatic transmissions, the automatic shifting (planetary gear) transmission increased in popularity with the motoring public. These transmissions improved the operating performance and fuel economy of the vehicle. The increased number of speed ratios reduces the step size between ratios and therefore improves the shift quality of the transmission by making the ratio interchanges substantially imperceptible to the operator under normal vehicle acceleration.

It has been suggested that the number of forward speed ratios be increased to six or more. Six-speed transmissions are disclosed in U.S. Pat. No. 4,070,927 issued to Polak on Jan. 31, 1978; and U.S. Pat. No. 6,422,969 issued to Raghavan and Usoro on Jul. 23, 2002.

Six-speed transmissions offer several advantages over four- and five-speed transmissions, including improved vehicle acceleration and improved fuel economy. While many trucks employ power transmissions having six or more forward speed ratios, passenger cars are still manufactured with three- and four-speed automatic transmissions and relatively few five or six-speed devices due to the size and complexity of these transmissions.

Seven-speed transmissions are disclosed in U.S. Pat. No. 6,623,397 issued to Raghavan, Bucknor and Usoro. Eight speed transmissions are disclosed in U.S. Pat. No. 6,425,841 issued to Haka. The Haka transmission utilizes three planetary gear sets and six torque transmitting devices, including two brakes and two clutches, to provide eight forward speed ratios and a reverse speed ratio. One of the planetary gear sets is positioned and operated to establish two fixed speed input members for the remaining two planetary gear sets. Seven-, eight- and nine-speed transmissions provide further improvements in acceleration and fuel economy over six-speed transmissions. However, like the six-speed transmissions discussed above, the development of seven-, eight- and nine-speed transmissions has been precluded because of complexity, size and cost.

SUMMARY OF THE INVENTION

It is an object of the present invention to provide an improved family of transmissions having three planetary gear sets controlled to provide at least six forward speed ratios and at least one reverse speed ratio.

In one aspect of the present invention, the family of transmissions has three planetary gear sets, each of which includes a first, second and third member, which members may comprise a sun gear, a ring gear, a planet carrier assembly member, or a pinion, in any order.

In referring to the first, second and third gear sets in this description and in the claims, these sets may be counted "first" to "third" in any order in the drawings (i.e., left to right, right to left, etc.).

In another aspect of the present invention, the planetary gear sets may be of the single pinion-type or of the double pinion-type.

In another aspect of the present invention, a first member of the first or second planetary gear sets is continuously interconnected with the first member of the third planetary gear set through a first interconnecting member.

In another aspect of the present invention, a second member of the first, second or third planetary gear sets is continuously connected with another member of the first, second or third planetary gear set or with a stationary member (transmission housing/casing) through a second interconnecting member.

In another aspect of the present invention, the planet carrier assembly member of the first planetary gear set is continuously connected with the planet carrier assembly member of the second planetary gear set. This connection is referred to herein as a third interconnecting member.

In yet another aspect of the present invention, the first and second planetary gear set are continuously connected via long pinion gears. This connection is referred to herein as a fourth interconnecting member.

The interconnecting members may be multi-piece rigid connections, single piece rigid connections, shared ring gears, shared carriers, shared sun gears, long pinions, such as in a Ravigneax gear set, or other suitable devices.

In yet a further aspect of the invention, each family member incorporates an output shaft which is continuously connected with at least one member of the planetary gear sets. The input shaft is selectively connectable with at least one member of the planetary gear sets through a torque-transmitting mechanism (torque transfer device).

In still a further aspect of the invention, a first torque-transmitting mechanism, such as an input clutch, selectively connects a member of the first or second planetary gear set with the input shaft.

In another aspect of the invention, a second torque-transmitting mechanism, such as a clutch, selectively connects another member of the first or second planetary gear set with the input shaft.

In a still further aspect of the invention, a third torque-transmitting mechanism, such as an input clutch, selectively connects a member of the third planetary gear set with the input shaft.

In a still further aspect of the invention, a fourth torque-transmitting mechanism, such as a brake, selectively connects a member of the first or second planetary gear set with a stationary member (transmission housing/casing).

In a still further aspect of the invention, a fifth torque-transmitting mechanism, such as a clutch, selectively connects a member of the third planetary gear set with another member of the third planetary gear set. Alternatively; a fifth torque-transmitting mechanism, such as a brake, selectively connects a member of the third planetary gear set with a stationary member (transmission housing/casing).

In still another aspect of the invention, an optional sixth torque-transmitting mechanism, such as a clutch, selectively connects a member of the third planetary gear set with a member of the first or second planetary gear set or with the input shaft. Alternatively, an optional sixth torque-transmitting mechanism, such as a brake, selectively connects a member of the third planetary gear set with a stationary member (transmission housing/casing).

In still another aspect of the invention, an optional seventh torque-transmitting mechanism, such as a clutch, selectively connects a member of third planetary gear set with the input shaft or with a member of the first or second planetary gear set.

In still another aspect of the invention, the up to seven torque-transmitting mechanisms are selectively engageable in combinations to yield at least six forward speed ratios and at least one reverse speed ratio.

The above objects and other objects, features, and advantages of the present invention are readily apparent from the following detailed description of the best modes for carrying out the invention when taken in connection with the accompanying drawings.

BRIEF DESCRIPTION OF THE DRAWINGS

FIG. 1a is a schematic representation of a powertrain including a planetary transmission incorporating a family member of the present invention;

FIG. 1b is a truth table and chart depicting some of the operating characteristics of the powertrain shown in FIG. 1a;

FIG. 2a is a schematic representation of a powertrain having a planetary transmission incorporating another family member of the present invention;

FIG. 2b is a truth table and chart depicting some of the operating characteristics of the powertrain shown in FIG. 2a;

FIG. 3a is a schematic representation of a powertrain having a planetary transmission incorporating another family member of the present invention;

FIG. 3b is a truth table and chart depicting some of the operating characteristics of the powertrain shown in FIG. 3a;

FIG. 4a is a schematic representation of a powertrain having a planetary transmission incorporating another family member of the present invention;

FIG. 4b is a truth table and chart depicting some of the operating characteristics of the powertrain shown in FIG. 4a;

FIG. 5a is a schematic representation of a powertrain having a planetary transmission incorporating another family member of the present invention;

FIG. 5b is a truth table and chart depicting some of the operating characteristics of the powertrain shown in FIG. 5a;

FIG. 6a is a schematic representation of a powertrain having a planetary transmission incorporating another family member of the present invention; and FIG. 6b is a truth table and chart depicting some of the operating characteristics of the powertrain shown in FIG. 6a.

DETAILED DESCRIPTION OF THE PREFERRED EMBODIMENTS

Figures 1A, 1B:
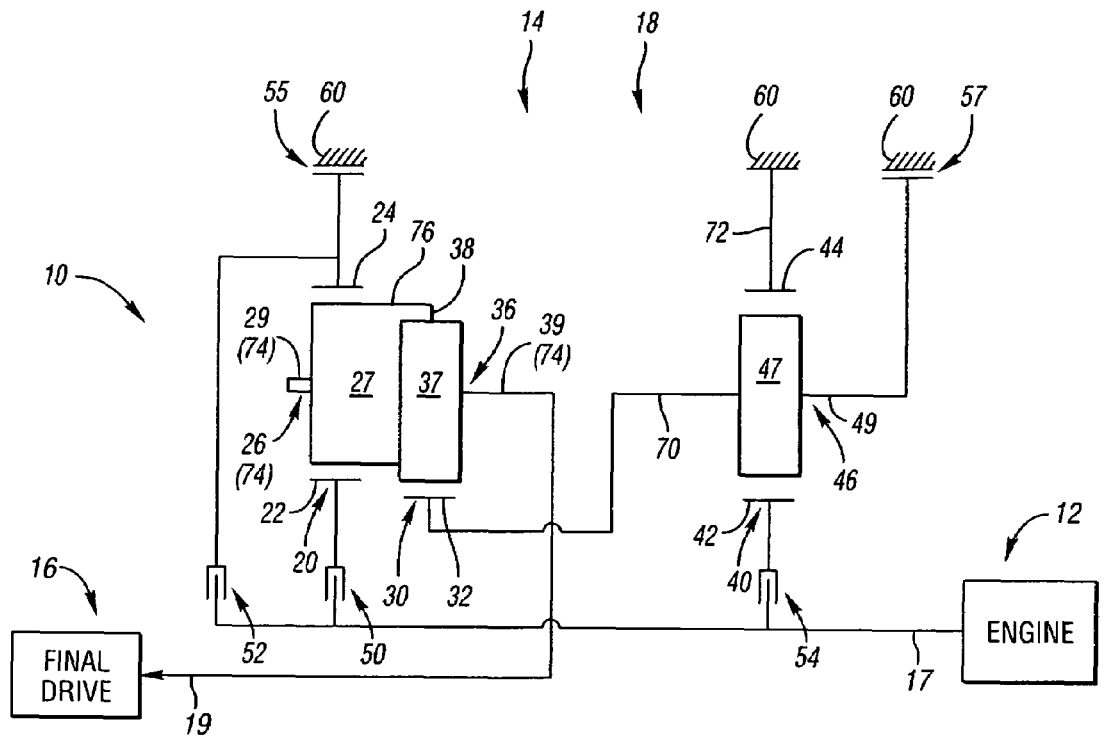

Referring to the drawings, wherein like characters represent the same or corresponding parts throughout the several views, there is shown in FIG. 1a a powertrain 10 having a conventional engine 12, a planetary transmission 14, and a conventional final drive mechanism 16.

The planetary transmission 14 includes an input shaft 17 connected with the engine 12, a planetary gear arrangement 18, and an output shaft 19 continuously connected with the final drive mechanism 16. The planetary gear arrangement 18 includes three planetary gear sets 20, 30 and 40.

The planetary gear set 20 includes a sun gear member 22, a ring gear member 24, and a planet carrier assembly member 26. The planet carrier assembly member 26 includes a plurality of long pinion gears 27 rotatably mounted on a carrier member 29 and disposed in meshing relationship with both the sun gear member 22 and the ring gear member 24.

The planetary gear set 30 includes a sun gear member 32 and a planet carrier assembly member 36. The planet carrier assembly member 36 includes a plurality of pinion gears 37, 38 rotatably mounted on a carrier member 39. The pinion gears 37 are disposed in meshing relationship with both the sun gear member 32 and the respective pinion gear 38. The planet carrier assembly member 36 is integral with the planet carrier assembly member 26. The pinion gears 38 are integral with the pinion gears 27 (i.e., they are formed by long pinion gears).

The planetary gear set 40 includes a sun gear member 42, a ring gear member 44, and a planet carrier assembly member 46. The planet carrier assembly member 46 includes a plurality of pinion gears 47 rotatably mounted on a carrier member 49, wherein the pinion gears 47 are disposed in meshing relationship with both the sun gear member 42 and the ring gear member 44.

The planetary gear arrangement also includes five torque-transmitting mechanisms 50, 52, 54, 55 and 57. The torque-transmitting mechanisms 50, 52 and 54 are rotating-type torque-transmitting mechanisms, commonly termed clutches. The torque-transmitting mechanisms 55 and 57 are stationary-type torque transmitting mechanisms, commonly termed brakes or reaction clutches.

The output shaft 19 is continuously connected with the planet carrier assembly member 36. The sun gear member 32 is continuously connected with the planet carrier assembly member 46 through the interconnecting member 70. The ring gear member 44 is continuously connected with the transmission housing 60 through the interconnecting member 72. The integral connection of the planet carrier assembly members 26 and 36 is referred to herein as the third interconnecting member 74. The integral connection of the long pinion gears 27, 38 is referred to herein as the fourth interconnecting member 76.

The sun gear member 22 in selectively connectable with the input shaft 17 through the input clutch 50. The ring gear member 24 is selectively connectable with the input shaft 17 through the input clutch 52. The sun gear member 42 is selectively connectable with the input shaft 17 through the input clutch 74. The ring gear member 24 is selectively connectable with the transmission housing 60 through the brake 55. The planet carrier assembly member 46 is selectively connectable with the transmission housing 60 through the brake 57.

As shown in FIG. 1b, and in particular the truth table disclosed therein, the torque-transmitting mechanisms are selectively engaged in combinations of two to provide six forward speed ratios and one reverse speed ratio.

The reverse speed ratio is established with the engagement of the input clutch 54 and brake 55. The input clutch 54 connects the sun gear member 42 with the input shaft 17. The brake 55 connects the ring gear member 24 with the transmission housing 60.

The first forward speed ratio is establish with the engagement of the input clutch 50 and the brake 55. The input clutch 50 connects the sun gear member 22 with the input shaft 17. The brake 55 connects the ring gear member 24 with the transmission housing 60.

The second forward speed ratio is established with the engagement of the input clutch 50 and the brake 57. The input clutch 50 connects the sun gear member 22 with the input shaft 17. The brake 57 connects the planet carrier assembly member 46 with the transmission housing 60.

The third forward speed ratio is established with the engagement of the input clutches 50 and 54. The input clutch 50 connects the sun gear member 22 with the input shaft 17. The input clutch 54 connects the sun gear member 42 with the input shaft 17.

The fourth forward speed ratio is established with the engagement of the clutches 50 and 52. In this configuration, the input shaft 17 is connected in a direct drive relationship with the output shaft 19. The numerical value of the fourth forward ratio is 1.

The fifth forward speed ratio is established with the engagement of the input clutches 52 and 54. The input clutch 52 connects the ring gear member 24 with the input shaft 17. The input clutch 54 connects the sun gear member 42 with the input shaft 17.

The sixth forward speed ratio is established with the engagement with the input clutch 52 and the brake 57. The input clutch 52 connects the ring gear member 24 with the input shaft 17. The brake 57 connects the planet carrier assembly member 46 with the transmission housing 60.

As set forth above, the engagement schedule for the torque-transmitting mechanisms is shown in the truth table of FIG. 1b. This truth table also provides an example of speed ratios that are available utilizing the ring gear/sun gear tooth ratios given by way of example in FIG. 1b. The $N_{R1}/N_{S1}$ value is the tooth ratio of the planetary gear set 20; the $N_{R2}/N_{S2}$ value is the tooth ratio of the planetary gear set 30; and the $N_{R3}/N_{S3}$ value is the tooth ratio of the planetary gear set 40. Also, the chart of FIG. 1b describes the ratio steps that are attained utilizing the sample of tooth ratios given. For example, the step ratio between the first and second forward speed ratios is 1.78, while the step ratio between the reverse and first forward ratio is −0.98

Figures 2A, 2B:
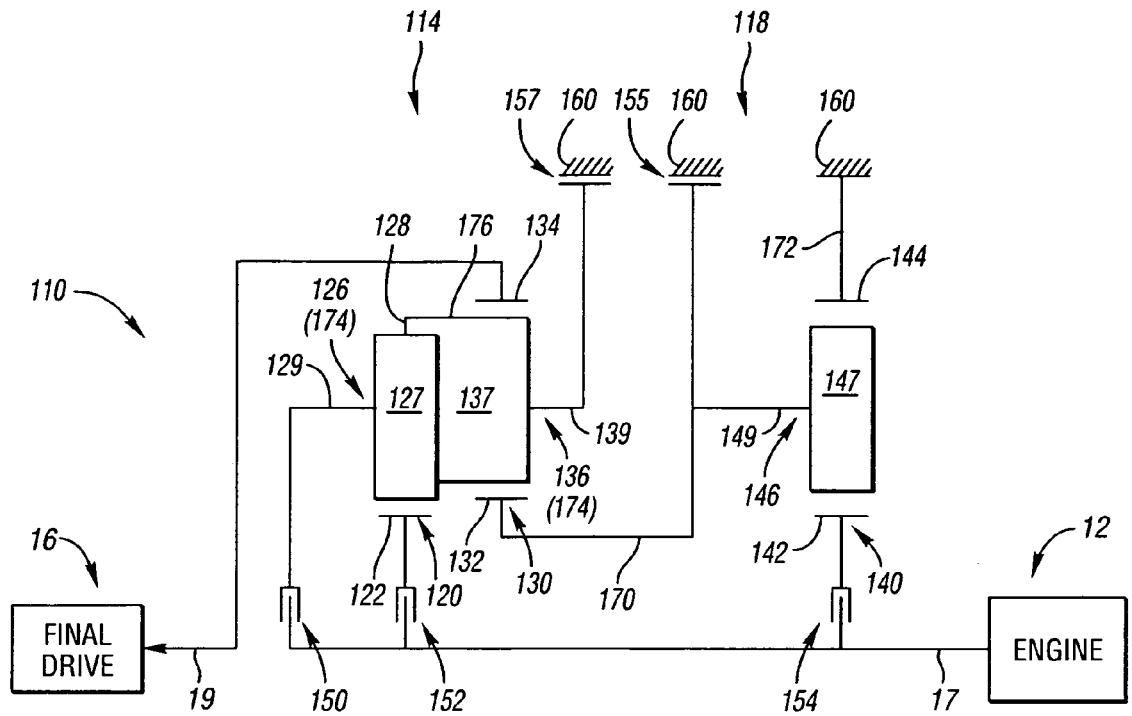

FIG. 2a shows a powertrain 110 having a conventional engine 12, a planetary transmission 114, and a conventional final drive mechanism 16.

The planetary transmission 114 includes an input shaft 17 continuously connected with the engine 12, a planetary gear arrangement 118, and an output shaft 19 continuously connected with the final drive mechanism 16. The planetary gear arrangement 118 includes three planetary gear sets 120, 130 and 140.

The planetary gear set 120 includes a sun gear member 122 and a planet carrier assembly member 126. The planet carrier assembly member 126 includes a plurality of pinion gears 127, 128 rotatably mounted on a carrier member 129. The pinion gears 127 are disposed in meshing relationship with both the sun gear member 122 and the respective pinion gear 128.

The planetary gear set 130 includes a sun gear member 132, a ring gear member 134, and a planet carrier assembly member 136. The planet carrier assembly member 136 includes a plurality of long pinion gears 137 rotatably mounted on a carrier member 139 and disposed in meshing relationship with both the sun gear member 132 and the ring gear member 134. The planet carrier assembly member 136 is integral with the planet carrier assembly member 126. The pinion gears 137 are integral with the pinion gears 128 (i.e., they are formed by long pinion gears).

The planetary gear set 140 includes a sun gear member 142, a ring gear member 144, and a planet carrier assembly member 146. The planet carrier assembly member 146 includes a plurality of pinion gears 147 rotatably mounted on a carrier member 149 and disposed in meshing relationship with both the sun gear member 142 and the ring gear member 144.

The planetary gear arrangement 118 also includes five torque-transmitting mechanisms 150, 152, 154, 155 and 157. The torque-transmitting mechanisms 150, 152, and 154 are rotating-type torque-transmitting mechanisms, commonly termed clutches. The torque-transmitting mechanisms 155 and 157 are stationary-type torque transmitting mechanisms, commonly termed brakes or reaction clutches.

The output shaft 19 is continuously connected with the ring gear member 134. The sun gear member 132 is continuously connected with the planet carrier assembly member 146 through the interconnecting member 170. The ring gear member 144 is continuously connected with the transmission housing 160 through the interconnecting member 172. The integral connection of the planet carrier assembly members 126, 136 is referred to herein as interconnecting member 174. The integral connection of the pinion gears 128, 137 is referred to herein as interconnecting member 176.

The planet carrier assembly member 126 is selectively connectable with the input shaft 17 through input clutch 150. The sun gear member 122 is selectively connectable with the input shaft 17 through the input clutch 152. The sun gear member 142 is selectively connectable with the input shaft 17 through the input clutch 154. The planet carrier assembly member 146 is selectively connectable with the transmission housing 160 through brake 155. The planet carrier assembly member 136 is selectively connectable with the transmission housing 160 through the brake 157.

The truth table of FIG. 2b describes the engagement sequence utilized to provide six forward speed ratios and one reverse speed ratio in the planetary gear arrangement 118 shown in FIG. 2a.

The truth tables given in FIGS. 2b, 3b, 4b, 5b and 6b show the engagement sequences for the torque-transmitting mechanisms to provide at least six forward speed ratios and at least one reverse ratio. As shown and described above for the configuration in FIG. 1a, those skilled in the art will understand from the respective truth tables how the speed ratios are established through the planetary gear sets identified in the written description.

As set forth above, the truth table of FIG. 2b describes the engagement sequence of the torque-transmitting mechanisms utilized to provide one reverse drive ratio and six forward speed ratios. The truth table also provides an example of the ratios that can be attained with the family members shown in FIG. 2a utilizing the sample tooth ratios given in FIG. 2b. The $N_{R1}/N_{S1}$ value is the tooth ratio of the planetary gear set 120; the $N_{R2}/N_{S2}$ value is the tooth ratio of the planetary gear set 130; and the $N_{R3}/N_{S3}$ value is the tooth ratio of the planetary gear set 140. Also shown in FIG. 2b are the ratio steps between single step ratios in the forward direction as well as the reverse to first step ratio. For example, the first to second step ratio is 1.90.

Figures 3A, 3B:
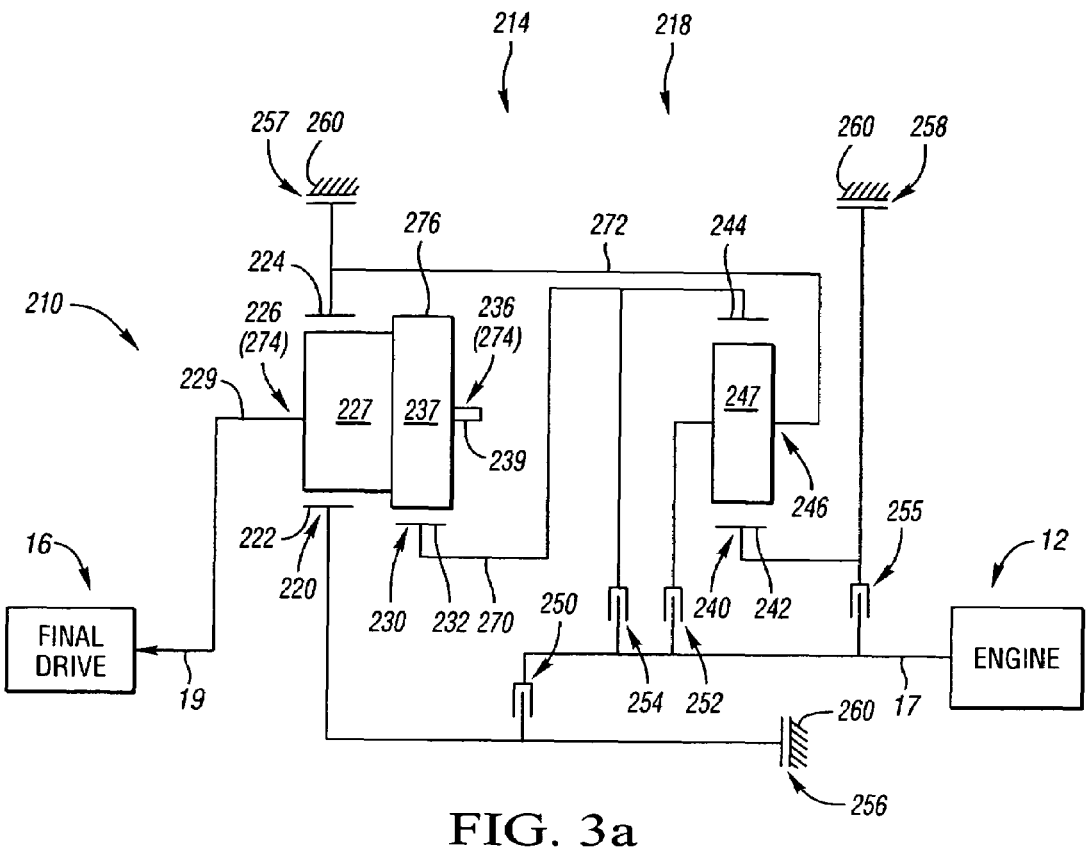

Turning to FIG. 3a, a powertrain 210 includes the engine 12, a planetary transmission 214, and a final drive mechanism 16. The planetary transmission 214 includes an input shaft 17 continuously connected with the engine 12, a planetary gear arrangement 218, and an output shaft 19 continuously connected with the final drive mechanism 16. The planetary gear arrangement 218 includes three planetary gear sets 220, 230 and 240.

The planetary gear set 220 includes a sun gear member 222, a ring gear member 224 and a planet carrier assembly member 226. The planet carrier assembly member 226 includes a plurality of pinion gears 227 rotatably mounted on a carrier member 229. The pinion gears 227 are disposed in meshing relationship with both the sun gear member 222 and the ring gear member 224.

The planetary gear set 230 includes a sun gear member 232 and a planet carrier assembly member 236. The planet carrier assembly member 236 includes a plurality of pinion gears 237 rotatably mounted on a carrier member 239 and disposed in meshing relationship with the sun gear member 232. The pinion gears 237 are integral with the pinion gears 227 (i.e., formed by long or interconnected pinion gears). The planet carrier assembly member 226 is continuously connected with (integral with) the planet carrier assembly member 236.

The planetary gear set 240 includes a sun gear member 242, a ring gear member 244, and a planet carrier assembly member 246. The planet carrier assembly member 246 includes a plurality of pinion gears 247 rotatably mounted on a carrier member 249 and disposed in meshing relationship with both the sun gear member 242 and with the ring gear member 244.

The planetary gear arrangement 218 also includes seven torque-transmitting mechanisms 250, 252, 254, 255, 256, 257 and 258. The torque-transmitting mechanisms 250, 252, 254 and 255 are rotating type torque-transmitting mechanisms, commonly termed clutches. The torque-transmitting mechanisms 256, 257 and 258 are stationary-type torque transmitting mechanisms, commonly termed brakes or reaction clutches.

The output shaft 19 is continuously connected with the planet carrier assembly member 226. The sun gear member 232 is continuously connected with the ring gear member 244 through the interconnecting member 270. The ring gear member 224 is continuously connected with the planet carrier assembly member 246 through the interconnecting member 272. The integral connection of the planet carrier assembly members 226, 236 is referred to herein as interconnecting member 274. The integral connection of the long pinion gears 227, 237 is referred to herein as interconnecting member 276.

The sun gear member 222 is selectively connectable with the input shaft 17 through the input clutch 250. The planet carrier assembly member 246 is selectively connectable with the input shaft 17 through the input clutch 252. The ring gear member 244 is selectively connectable with the input shaft 17 through the input clutch 254. The sun gear member 242 is selectively connectable with the input shaft 17 through the input clutch 255. The sun gear member 222 is selectively connectable with the transmission housing 260 through the brake 256. The ring gear member 224 is selectively connectable with the transmission housing 260 through the brake 257. The sun gear member 242 is selectively connectable with the transmission housing 260 through the brake 258.

As shown in the truth table in FIG. 3b, the torque-transmitting mechanisms are engaged in combinations of two to establish eight speed ratios and two reverse speed ratios.

As previously set forth, the truth table of FIG. 3b describes the combinations of engagements utilized for the forward and reverse speed ratios. The truth table also provides an example of speed ratios that are available with the family member described above. These examples of speed ratios are determined utilizing the tooth ratios given in FIG. 3b. The $N_{R1}/N_{S1}$ value is the tooth ratio of the planetary gear set 220; the $N_{R2}/N_{S2}$ value is the tooth ratio of the planetary gear set 230; and the $N_{R3}/N_{S3}$ value is the tooth ratio of the planetary gear set 240. Also depicted in FIG. 3b is a chart representing the ratio steps between adjacent forward speed ratios and between the first and reverse speed ratio. For example, the first to second ratio interchange has a step of 2.29.

Figures 4A, 4B:
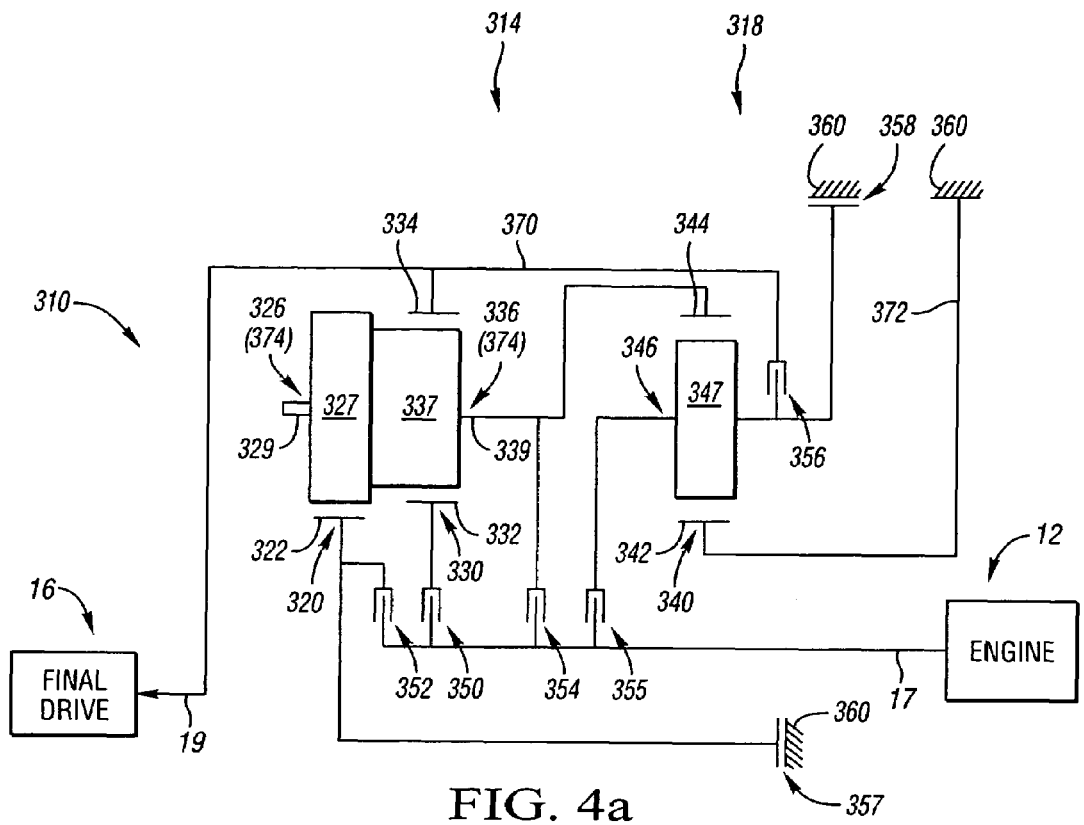

A powertrain 310, shown in FIG. 4a, includes the engine 12, a planetary transmission 314, and the final drive mechanism 16. The planetary transmission 314 includes an input shaft 17 continuously connected with the engine 12, a planetary gear arrangement 318, and an output shaft 19 continuously connected with the final drive mechanism 16. The planetary gear arrangement 318 includes three planetary gear sets 320, 330 and 340.

The planetary gear set 320 includes a sun gear member 322 and a planet carrier assembly member 326. The planet carrier assembly member 326 includes a plurality of pinion gears 327 rotatably mounted on a carrier member 329. The pinion gears 327 are disposed in meshing relationship with the sun gear member 322.

The planetary gear set 330 includes a sun gear member 332, a ring gear member 334, and a planet carrier assembly member 336. The planet carrier assembly member 336 includes a plurality of pinion gears 337 rotatably mounted on a carrier member 339 and disposed in meshing relationship with both the sun gear member 332 and the ring gear member 334. The pinion gears 337 are integral with the pinion gears 327 (i.e., formed by long or interconnected pinion gears). The planet carrier assembly member 326 is continuously connected with (integral with) the planet carrier assembly member 336.

The planetary gear set 340 includes a sun gear member 342, a ring gear member 344, and a planet carrier assembly member 346. The planet carrier assembly member 346 includes a plurality of pinion gears 347 rotatably mounted on a carrier member 349 and disposed in meshing relationship with both the sun gear member 342 and the ring gear member 344.

The planetary gear arrangement 318 also includes seven torque-transmitting mechanisms 350, 352, 354, 355, 356, 357 and 358. The torque-transmitting mechanisms 350, 352, 354, 355 and 356 are rotating type torque-transmitting mechanisms, commonly termed clutches. The torque-transmitting mechanisms 357 and 358 are stationary-type torque transmitting mechanisms, commonly termed brakes or reaction clutches.

The output shaft 19 is continuously connected with the ring gear member 334. The planet carrier assembly member 336 is continuously connected with the ring gear member 344 through the interconnecting member 370. The sun gear member 342 is continuously connected with the transmission housing 360 through interconnecting member 372. The integral connection of the planet carrier assembly members 326, 336 is referred to herein as interconnecting member 374. The integral connection of the pinion gears 327, 337 is referred to herein as interconnecting member 376.

The sun gear member 332 is selectively connectable with the input shaft 17 through the input clutch 350. The sun gear member 322 is selectively connectable with the input shaft 17 through the input clutch 352. The ring gear member 344 is selectively connectable with the input shaft 17 through the input clutch 354. The planet carrier assembly member 346 is selectively connectable with the input shaft 17 through the input clutch 355. The ring gear member 334 is selectively connectable with the planet carrier assembly member 346 through the clutch 356. The sun gear member 322 is selectively connectable with the transmission housing 360 through the brake 357. The planet carrier assembly member 346 is selectively connectable with the transmission housing 360 through the brake 358.

The truth table shown in FIG. 4b describes the engagement combination and the engagement sequence necessary to provide two reverse drive ratio and eight forward speed ratios. A sample of the numerical values for the ratios is also provided in the truth table of FIG. 4b. These values are determined utilizing the ring gear/sun gear tooth ratios also given in FIG. 4b. The $N_{R1}/N_{S1}$ value is the tooth ratio for the planetary gear set 320; the $N_{R2}/N_{S2}$ value is the tooth ratio for the planetary gear set 330; and the $N_{R3}/N_{S3}$ value is the tooth ratio for the planetary gear set 340. Also given in FIG. 4b is a chart describing the step ratios between the adjacent forward speed ratios and the reverse to first forward speed ratio. For example, the first to second forward speed ratio step is 1.75.

Figures 5A, 5B:
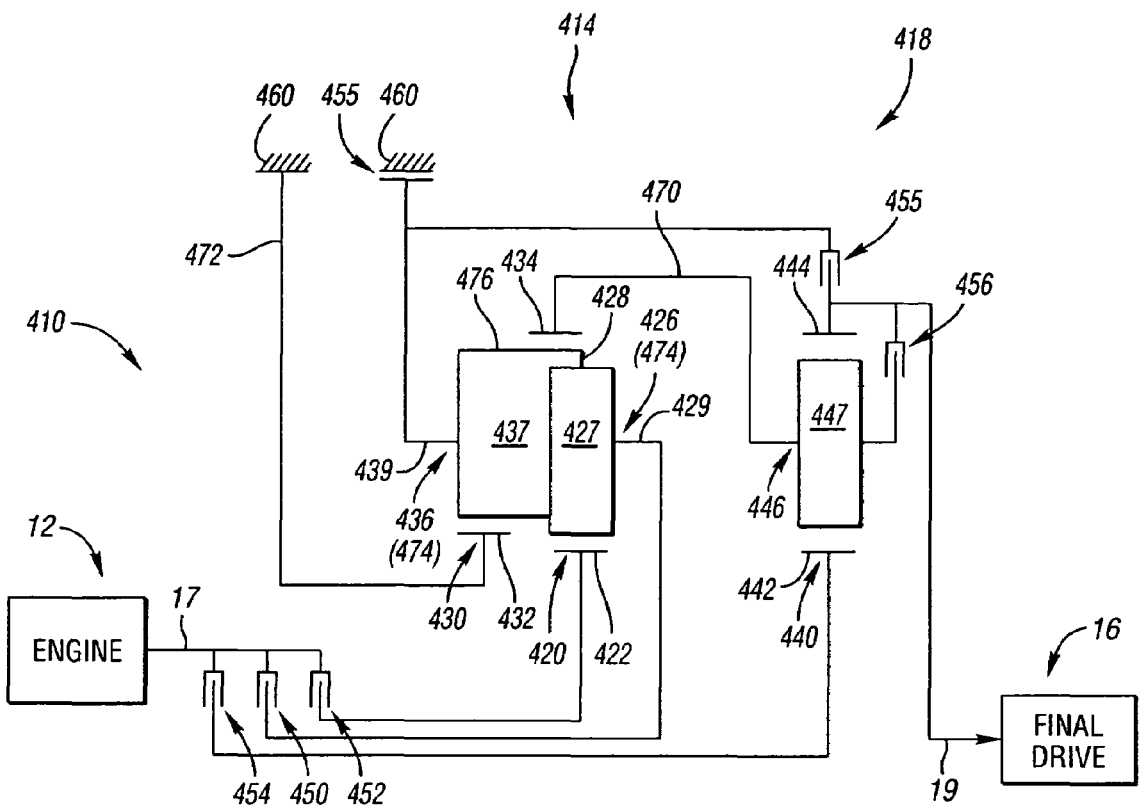

A powertrain 410, shown in FIG. 5a, includes the engine 12, a planetary transmission 414 and the final drive mechanism 16. The planetary transmission 414 includes a planetary gear arrangement 418, input shaft 17 and output shaft 19. The planetary gear arrangement 418 includes three simple planetary gear sets 420, 430 and 440.

The planetary gear set 420 includes a sun gear member 422 and a planet carrier assembly 426. The planet carrier assembly 426 includes a plurality of pinion gears 427, 428 rotatably mounted on a carrier member 429. The pinion gears 427 are disposed in meshing relationship with both the sun gear member 422 and the respective pinion gear 428.

The planetary gear set 430 includes a sun gear member 432, a ring gear member 434, and a planet carrier assembly member 436. The planet carrier assembly member 436 includes a plurality of pinion gears 437 rotatably mounted on a carrier member 439 and disposed in meshing relationship with both the ring gear member 434 and the sun gear member 432. The pinion gears 437 are integral with the pinion gears 428 (i.e., formed by long pinions). The planet carrier assembly member 436 is continuously connected with (integral with) the planet carrier assembly member 426.

The planetary gear set 440 includes a sun gear member 442, a ring gear member 444, and a planet carrier assembly member 446. The planet carrier assembly member 446 includes a plurality of pinion gears 447 rotatably mounted on a carrier member 449 and disposed in meshing relationship with both the sun gear member 442 and the ring gear member 444.

The planetary gear arrangement 418 also includes six torque-transmitting mechanisms 450, 452, 454, 455, 456 and 457. The torque-transmitting mechanisms 450, 452, 454, 455 and 456 are rotating type torque-transmitting mechanisms, commonly termed clutches. The torque-transmitting mechanism 457 is a stationary-type torque transmitting mechanism, commonly termed brake or reaction clutch.

The output shaft 19 is continuously connected with the ring gear member 444. The ring gear member 434 is continuously connected with the planet carrier assembly member 446 through the interconnecting member 470. The sun gear member 432 is continuously connected with the transmission housing 460 through the interconnecting member 472. The integral connection of the planet carrier assembly members 426, 436 is referred to herein as interconnecting member 474. The integral connection of the pinion gears 428, 437 is referred to herein as interconnecting member 476.

The planet carrier assembly member 426 is selectively connectable with the input shaft 17 through the input clutch 450. The sun gear member 422 is selectively connectable with the input shaft 17 through the input clutch 452. The sun gear member 442 is selectively connectable with the input shaft 17 through the input clutch 454. The planet carrier assembly member 436 is selectively connectable with the ring gear member 444 through the clutch 455. The ring gear member 444 is selectively connectable with the planet carrier assembly member 446 through the clutch 456. The planet carrier assembly member 436 is selectively connectable with the transmission housing 460 through the brake 457.

The truth table shown in FIG. 5b describes the engagement combination and sequence of the torque-transmitting mechanisms 450, 452, 454, 455, 456 and 457 that are employed to provide the forward and reverse drive ratios.

Also given in the truth table of FIG. 5b is a set of numerical values that are attainable with the present invention utilizing the ring gear/sun gear tooth ratios shown. The $N_{R1}/N_{S1}$ value is the tooth ratio of the planetary gear set 420; the $N_{R2}/N_{S2}$ value is the tooth ratio of the planetary gear set 430; and the $N_{R3}/N_{S3}$ value is the tooth ratio of the planetary gear set 440. FIG. 5b also provides a chart of the ratio steps between adjacent forward ratios and between the reverse and first forward ratio. For example, the ratio step between the first and second forward ratios is 1.42.

Figures 6A, 6B:
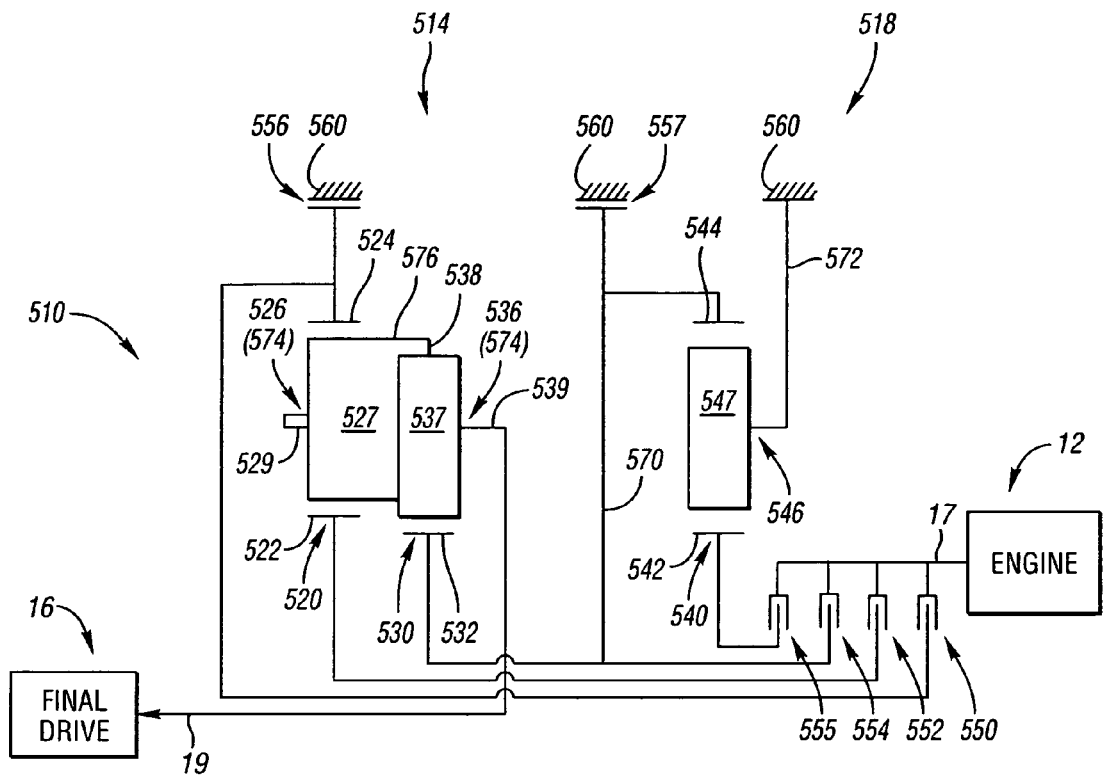

A powertrain 510, shown in FIG. 6a, includes an engine 12, a planetary gear transmission 514 and the final drive mechanism 16. The planetary transmission 514 includes the input shaft 17, a planetary gear arrangement 518 and the output shaft 19. The planetary gear arrangement 518 includes three planetary gear sets 520, 530 and 540.

The planetary gear set 520 includes a sun gear member 522, a ring gear member 524, and a planet carrier assembly 526. The planet carrier assembly 526 includes a plurality of long pinion gears 527 rotatably mounted on a carrier member 529 and disposed in meshing relationship with both the sun gear member 522 and the ring gear member 524.

The planetary gear set 530 includes a sun gear member 532 and a planet carrier assembly member 536. The planet carrier assembly member 536 includes a plurality of pinion gears 537, 538 rotatably mounted on a carrier member 539. The pinion gears 537 are disposed in meshing relationship with both the sun gear member 532 and the respective pinion gear 538. The planet carrier assembly member 536 is continuously connected with (integral with) the planet carrier assembly member 526. The pinion gears 527 are integral with pinion gears 538 (i.e., formed by long pinions).

The planetary gear set 540 includes a sun gear member 542, a ring gear member 544, and a planet carrier assembly member 546. The planet carrier assembly member 546 includes a plurality of pinion gears 547 rotatably mounted on a carrier member 549 and disposed in meshing relationship with both the sun gear member 542 and the ring gear member 544.

The planetary gear arrangement 518 also includes six torque-transmitting mechanisms 550, 552, 554, 555, 556 and 557. The torque-transmitting mechanisms 550, 552, 554 and 555 are rotating type torque-transmitting mechanisms, commonly termed clutches. The torque-transmitting mechanisms 556 and 557 are stationary-type torque transmitting mechanisms, commonly termed brakes or reaction clutches.

The output shaft 19 is continuously connected with the planet carrier assembly member 536. The sun gear member 532 is continuously connected with the ring gear member 544 through the interconnecting member 570. The planet carrier assembly member 546 is continuously connected with the transmission housing 560 through the interconnecting member 572. The integral connection of the planet carrier assembly members 526, 536 is referred to herein as interconnecting member 574. The integral connection of the pinion gears 527, 538 is referred to herein as interconnecting member 576.

The ring gear member 524 is selectively connectable with the input shaft 17 through the input clutch 550. The sun gear member 522 is selectively connectable with the input shaft 17 through the input clutch 552. The sun gear member 532 is selectively connectable with the input shaft 17 through the input clutch 554. The sun gear member 542 is selectively connectable with the input shaft 17 through the input clutch 555. The ring gear member 524 is selectively connectable with the transmission housing 560 through the brake 556. The ring gear member 544 is selectively connectable with the transmission housing 560 through the brake 557.

The truth table shown in FIG. 6b describes the engagement sequence and combination of the torque-transmitting mechanisms to provide one reverse speed ratio and seven forward speed ratios. The sample speed ratios given in the truth table are determined utilizing the tooth ratio values also given in FIG. 6b. The $N_{R1}/N_{S1}$ value is the tooth ratio of the planetary gear set 520; the $N_{R2}/N_{S2}$ value is the tooth ratio of the planetary gear set 530; and the $N_{R3}/N_{S3}$ value is the tooth ratio of the planetary gear set 540. FIG. 6b also provides a chart of the ratio steps between adjacent forward ratios and between the reverse and first forward ratio. For example, the ratio step between the first and second forward ratios is 1.79.

In the claims, the language "continuously connected" or "continuously connecting" refers to a direct connection or a proportionally geared connection, such as gearing to an offset axis. Also, the "stationary member" or "ground" may include the transmission housing (case) or any other non-rotating component or components. Also, when a torque transmitting mechanism is said to connect something to a member of a gear set, it may also be connected to an interconnecting member which connects it with that member. It is further understood that different features from different embodiments of the invention may be combined within the scope of the appended claims.

While the best modes for carrying out the invention have been described in detail, those familiar with the art to which this invention relates will recognize various alternative designs and embodiments for practicing the invention within the scope of the appended claims.

The invention claimed is:

1. A multi-speed transmission comprising:
an input shaft;
an output shaft;
first, second and third planetary gear sets each having first, second and third members;
said output shaft being continuously interconnected with a member of said planetary gear sets;
said input shaft being selectively interconnected with another member of said planetary gear sets;
a first interconnecting member continuously interconnecting said first member of said first or second planetary gear set with said first member of said third planetary gear set;
a second interconnecting member continuously interconnecting said second member of said first, second or third planetary gear set with said second member of said first, second or third planetary gear set or with a stationary member;
a third interconnecting member continuously interconnecting a planet carrier assembly member of said first planetary gear set with a planet carrier assembly member of said second planetary gear set;
a fourth interconnecting member continuously interconnecting said first planetary gear set with said second planetary gear set via long pinion gears;
wherein only one of said first and second planetary gear sets has a ring gear member;
a first torque-transmitting mechanism selectively interconnecting a member of said first or second planetary gear set with said input shaft;
a second torque-transmitting mechanism selectively interconnecting another member of said first or second planetary gear set with said input shaft;
a third torque-transmitting mechanism selectively interconnecting a member of said third planetary gear set with said input shaft;
a fourth torque-transmitting mechanism selectively interconnecting a member of said first or second planetary gear set with said stationary member;
a fifth torque-transmitting mechanism selectively interconnecting a member of said third planetary gear set with another member of said third planetary gear set or with said stationary member; and
said torque-transmitting mechanisms being engaged in combinations to establish at least six forward speed ratios and at least one reverse speed ratio between said input shaft and said output shaft.

2. The transmission defined in claim 1, wherein planet carrier assembly members of each of said planetary gear sets are single-pinion carriers.

3. The transmission defined in claim 1, wherein at least one planet carrier assembly member of said planetary gear sets is a double-pinion carrier.

4. The transmission defined in claim 1, wherein said first, second and third members are selected from a ring gear member, a sun gear member, a planet carrier assembly member, and a long pinion gear, in any order.

5. The transmission defined in claim 1, further comprising:
a sixth torque-transmitting mechanism selectively interconnecting a member of said third planetary gear set with a member of said first or second planetary gear set, with said input shaft, or with said stationary member.

6. The transmission defined in claim 5, further comprising:
a seventh torque-transmitting mechanism selectively interconnecting a member of said third planetary gear set with a member of said first or second planetary gear set, or with said input shaft.

7. A multi-speed transmission comprising:
an input shaft;
an output shaft;
a planetary gear arrangement having first, second and third planetary gear sets, each planetary gear set having first, second and third members;
said output shaft being continuously interconnected with a member of said planetary gear sets;
said input shaft being selectively interconnected with another member of said planetary gear sets;
a first interconnecting member continuously interconnecting said first member of said first or second planetary gear set with said first member of said third planetary gear set;
a second interconnecting member continuously interconnecting said second member of said first, second or third planetary gear set with another member of said first, second or third planetary gear set or with said stationary member;
a third interconnecting member continuously interconnecting a planet carrier assembly member of said first planetary gear set with a planet carrier assembly member of said second planetary gear set;
a fourth interconnecting member continuously interconnecting said first planetary gear set with said second planetary gear set via long pinion gears;

wherein only one of said first and second planetary gear sets has a ring gear member; and five torque-transmitting mechanisms for selectively interconnecting said members of said planetary gear sets with said input shaft, with said stationary member or with other members of said planetary gear sets, said five torque-transmitting mechanisms being engaged in combinations to establish at least six forward speed ratios and at least one reverse speed ratio between said input shaft and said output shaft.

8. The transmission defined in claim 7, wherein a first of said five torque-transmitting mechanisms is operable for selectively interconnecting a member of said first or second planetary gear set with said input shaft.

9. The transmission defined in claim 8, wherein a second of said five torque-transmitting mechanisms is operable for selectively interconnecting another member of said first or second planetary gear set with said input shaft.

10. The transmission defined in claim 9, wherein a third of said five torque-transmitting mechanisms is selectively operable for interconnecting a member of said third planetary gear set with said input shaft.

11. The transmission defined in claim 10, wherein a fourth of said five torque-transmitting mechanisms is selectively operable for interconnecting a member of said first or second planetary gear set with said stationary member.

12. The transmission defined in claim 11, wherein a fifth of said five torque-transmitting mechanisms is selectively operable for interconnecting a member of said third planetary gear set with another member of said third planetary gear set or with said stationary member.

13. The transmission defined in claim 12, further comprising:

a sixth torque-transmitting mechanism selectively interconnecting a member of said third planetary gear set with a member of said first or second planetary gear set, with said input shaft, or with said stationary member.

14. The transmission defined in claim 13, further comprising:

a seventh torque-transmitting mechanism selectively interconnecting a member of said third planetary gear set with a member of said first or second planetary gear set, or with said input shaft.

15. The transmission defined in claim 7, wherein planet carrier assembly members of each of said planetary gear sets are single-pinion carriers.

16. The transmission defined in claim 7, wherein at least one planet carrier assembly member of said planetary gear sets is a double-pinion carrier.

17. The transmission defined in claim 7, wherein said first, second and third members are selected from a ring gear member, a sun gear member, a planet carrier assembly member, and a long pinion gear, in any order.

* * * * *